O. BANNER.
COMBINED THRUST AND JOURNAL BEARING.
APPLICATION FILED JAN. 14, 1914.
1,158,424.
Patented Nov. 2, 1915.
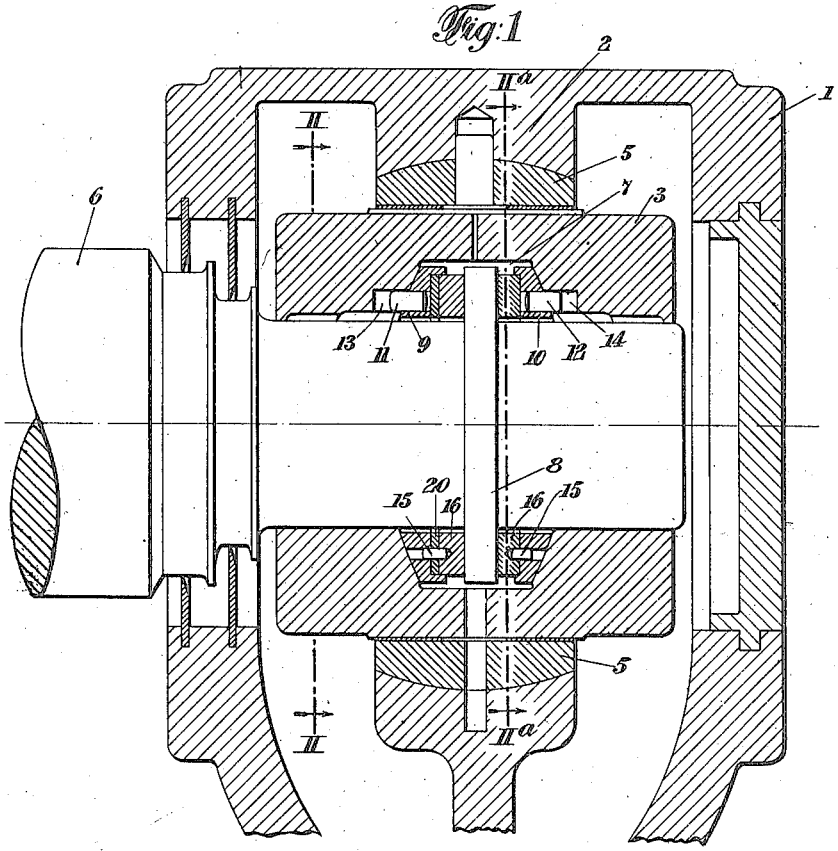
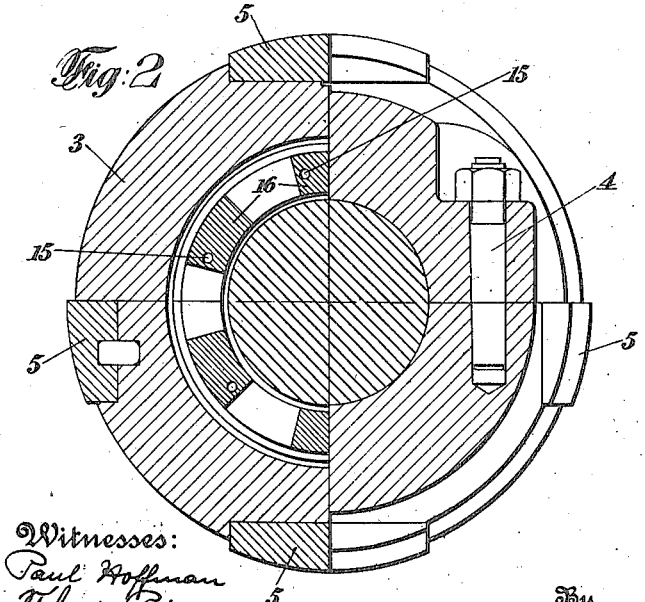
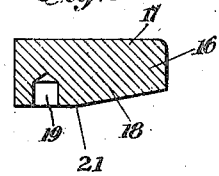

UNITED STATES PATENT OFFICE.

OTTO BANNER, OF EASTON, PENNSYLVANIA, ASSIGNOR TO INGERSOLL-RAND COMPANY, OF JERSEY CITY, NEW JERSEY, A CORPORATION OF NEW JERSEY.

COMBINED THRUST AND JOURNAL BEARING.

1,158,424.

Specification of Letters Patent. Patented Nov. 2, 1915.

Application filed January 14, 1914. Serial No. 811,930.

*To all whom it may concern:*

Be it known that I, OTTO BANNER, a subject of the German Emperor, residing at Easton, in the county of Northampton and State of Pennsylvania, have invented a certain new and useful Improvement in Combined Thrust and Journal Bearings, of which the following is a specification.

This invention relates to bearings for rotating shafts and more particularly to a combined thrust and journal bearing for turbo compressors and other machines having a considerable end thrust.

The object of this invention is to provide a simple bearing which will, at the same time, serve both as a thrust and journal bearing thus eliminating the necessity of providing two sets of bearings for each end of the shaft.

With this object in view, a bearing has been devised, a practical embodiment of which is shown in the accompanying drawings in which:

Figure 1 shows a longitudinal section through the bearing casing, Fig. 2, a composite transverse section the right half of which shows a section taken on the line II—II of Fig. 1 and the left a section taken on the line II$^a$—II$^a$, and Fig. 3, a section through one of the thrust blocks.

As shown, the bearing comprises a casing 1, of ordinary construction, which is provided interiorly with a concave bearing box seat 2. Resting in the bearing casing is a bearing box 3 which is in the form of a horizontally split sleeve, the two sections of which are secured together by bolts 4, one of which is shown in Fig. 2. In the outer surface of the sleeve 3 are secured shoes 5 which have convex outer surfaces fitting in the concave seat 2 and adapted to slide thereon so that the bearing box will adjust its position in response to any movement of the shaft. The bearing box is bored for the reception of the shaft 6 and has, in its central portion, a large bore 7 concentric with the shaft bore but of such length that a large proportion of the shaft bore is left to support the shaft in the manner of a journal bearing. The bore 7 forms a chamber around the shaft 6 which receives a thrust ring 8 on the shaft. The ends of this bore 7 are slightly concave and slanted inwardly slightly from the shaft. Surrounding the shaft and having their outer faces seated against the concave end walls of the chamber 7 are thrust block retaining rings 9 and 10 which are split to enable them to be placed around the shaft and are allowed limited movement with respect to the concave ends of the bore 7 by reason of dowel pins 11 and 12 which project loosely into slots 13 and 14, in the upper section of the bearing box 3. Projecting longitudinally of the shaft from the inner faces of these thrust block retaining rings are a series of dowel pins 15 spaced at equal intervals around the rings and loosely mounted on these dowel pins are a number of thrust blocks 16 which have flat inner faces 17 which rest against the opposite faces of the thrust ring 8 and outer faces 18 which are beveled, for a part of their length, and are provided with holes 19 which loosely fit over the pins 15, this manner of mounting allowing the thrust blocks 16 to pivot or rock on the edges 21 formed by the intersection of the flat and beveled portions of the outer faces 18, the pins 15 holding the thrust blocks in their proper positions around the thrust ring 8 and preventing them from following the rotation of the shaft. A liner 20 is provided in the thrust block retaining ring 9 so that wear can be compensated for.

It is to be understood that the present showing and description discloses only one specified modification of my invention and other forms and modifications are included in the spirit and scope of the invention as expressed in the claims.

What I claim is:

1. In combination with a shaft having a thrust flange, a split bearing box having a thrust flange receiving chamber, said chamber having slightly concave ends, thrust block retaining rings having convex outer faces fitting said concave chamber ends, securing means allowing limited movement of said retaining rings, and a plurality of thrust blocks pivotally mounted on said retaining rings on each side of said shaft thrust flange.

2. In combination with a shaft having a thrust flange, a split bearing box having a central thrust flange receiving chamber and extended bearing surfaces for said shaft on either side of said chamber, said chamber having slightly concave ends, thrust block retaining rings having convex outer faces fitting said concave chamber ends, securing means allowing limited movement of said retaining rings, and a plurality of thrust blocks pivotally mounted on said retaining rings on each side of said shaft thrust flange.

In testimony whereof, I have hereunto set my hand.

OTTO BANNER.

Witnesses:
PAUL HOFFMAN,
FLOYD U. PRICE.